United States Patent [19]
Liu

[11] 3,816,750
[45] June 11, 1974

[54] PYROELECTRIC DETECTOR
[75] Inventor: Sie T. Liu, Bloomington, Minn.
[73] Assignee: Honeywell Inc., Minneapolis, Minn.
[22] Filed: Jan. 11, 1973
[21] Appl. No.: 322,816

Related U.S. Application Data
[63] Continuation-in-part of Ser. No. 150,872, June 4, 1971, abandoned.

[52] U.S. Cl............................. 250/338, 252/520
[51] Int. Cl............................................. G01t 1/16
[58] Field of Search.................... 252/520; 250/338; 73/355 R

[56] References Cited
UNITED STATES PATENTS
2,879,401  3/1959  Chicurel........................ 73/355 R
3,586,439  6/1971  Treharne........................ 73/355 R OTHER PUBLICATIONS
"Electro–Optic Ceramic: Key to Tomorrow's Image," Ceramic Age, June 1970, pp. 32, 33, 35, 36, 37.

Primary Examiner—Archie R. Borchelt
Assistant Examiner—Davis L. Willis
Attorney, Agent, or Firm—Lamont B. Koontz; David R. Fairbairn

[57] ABSTRACT

A pyroelectric detector is formed by a hot-pressed ceramic body of ferroelectric Lead Lanthanum Zirconate Titanate (PLZT) having the formula $Pb_{1-x}La_x(Zr_yTi_z)_{1-x/4}O_3$.

53 Claims, 12 Drawing Figures

PATENTED JUN 11 1974 3,816,750

PYROELECTRIC DETECTOR

REFERENCE TO RELATED APPLICATIONS

This application is a continuation-in-part of my now abandoned copending application Ser. No. 150,872 filed June 4, 1971, entitled PYROELECTRIC DETECTOR, and assigned to the same assignee as the present application.

BACKGROUND OF THE INVENTION

This invention relates to a pyroelectric detector, and in particular to an extremely sensitive material for use in pyroelectric detectors.

Pyroelectric detectors are a class of thermal detectors which utilize an electrically poled pyroelectric material. When the pyroelectric material is subjected to a change in temperature, the electrical polarization of the material changes, thereby producing a voltage across the pyroelectric material. In other words, the pyroelectric detector can be characterized essentially as a capacitor upon which a time varying charge, and consequently a voltage, appears when the temperature of the detector is changed. Since the pyroelectric effect is a direct result of the temperature dependence of the polarization, it can be used as a means of detecting infrared radiation energy.

Although any ferroelectric material may be utilized as a pyroelectric detector, the ferroelectric materials differ greatly in their performance as a pyroelectric detector. The figure of merit most commonly used for evaluating detector performance is the detectivity $D^*$. The two materials exhibiting the largest value of $D^*$, thereby making them the most desirable pyroelectric materials, are Triglycine Sulphate (TGS) and Strontium Barium Niobate (SBN). The detectivity of TGS has been reported as high as $1.59 \times 10^8$ while the detectivity of SBN has been recorded as high as $1.41 \times 10^8$ at 1KHz.

It has been found, however, that TGS has several disadvantages as a pyroelectric material. First it exhibits a very high impedance because of its low dielectric constant ($\epsilon = 35$), and therefore requires an extremely high impedance, low noise amplifier to process the signals produced. It may therefore be stated that the TGS pyroelectric detector is "amplifier noise limited." Second, TGS is hydroscopic, in other words it cannot be exposed to water. Therefore a detector utilizing TGS requires a window to keep out moisture. Third, TGS exhibits self-depoling when heated close to its Curie point of approximately 49°C. Fourth, TGS is a single crystal material and is therefore more difficult to prepare than a ceramic material.

SBN also has disadvantages. First, SBN is a single crystal which is difficult to prepare. Second, certain SBN compositions, especially those having a lower Curie temperature, a high pyroelectric coefficient, and a high dielectric coefficient, tend to self-depole.

SUMMARY OF THE INVENTION

This invention relates to a new pyroelectric detector material having extremely attractive properties. The pyroelectric detector of the present invention is formed from a hot-pressed ceramic body of ferroelectric Lead Lanthanum Zirconate Titanate (PLZT) having the formula $Pb_{1-x}La_x(Zr_yTi_z)_{1-x/4}O_3$. The electro-optic properties of various compositions of PLZT ceramics have been studied extensively. The various applications of PLZT ceramic as an electro-optic device are described in "Electro-Optic Ceramic: Key to Tomorrows Image" Ceramic Age, page 32, June 1970. The pyroelectric properties of PLZT ceramics have not heretofore been investigated.

It has been found that certain compositions of PLZT ceramic within a particular compositional range exhibit unexpectedly high detectivity $D^*$ as well as a high dielectric constant when utilized as a pyroelectric material in a pyroelectric detector. In addition, certain PLZT compositions exhibit state pyroelectric detector properties over a wide range of operating temperatures.

In addition to its high detectivity, which has been found to be comparable to the value of detectivity exhibited by the best known prior art materials TGS and SBN at low frequencies (less than 100Hz), PLZT has several advantages. First, it is a hot-pressed ceramic material and therefore may be produced extremely cheaply by batch process fabrication. Second, as a ceramic it exhibits very good mechanical strength. Third, certain compositions of PLZT have high pyroelectric coefficients and high dielectric constants which enable large scale, small element pyroelectric detector arrays to be fabricated. Large bodies of PLZT ceramic suitable for large scale arrays are easier to prepare than large bodies of conventional single crystal pyroelectric detector materials. Fourth, although PLZT exhibits a slightly higher loss at present, the loss can be improved by processing. Fifth, the lower impedance exhibited by PLZT due to the high dielectric constant allows the use of electronics for amplification of the pyroelectric signal that do not have to meet requirements which are as stringent as the electronics utilized with low dielectric constant single crystal pyroelectric materials.

DESCRIPTION OF THE PREFERRED EMBODIMENTS

PLZT Phase Diagram

Figure 1:
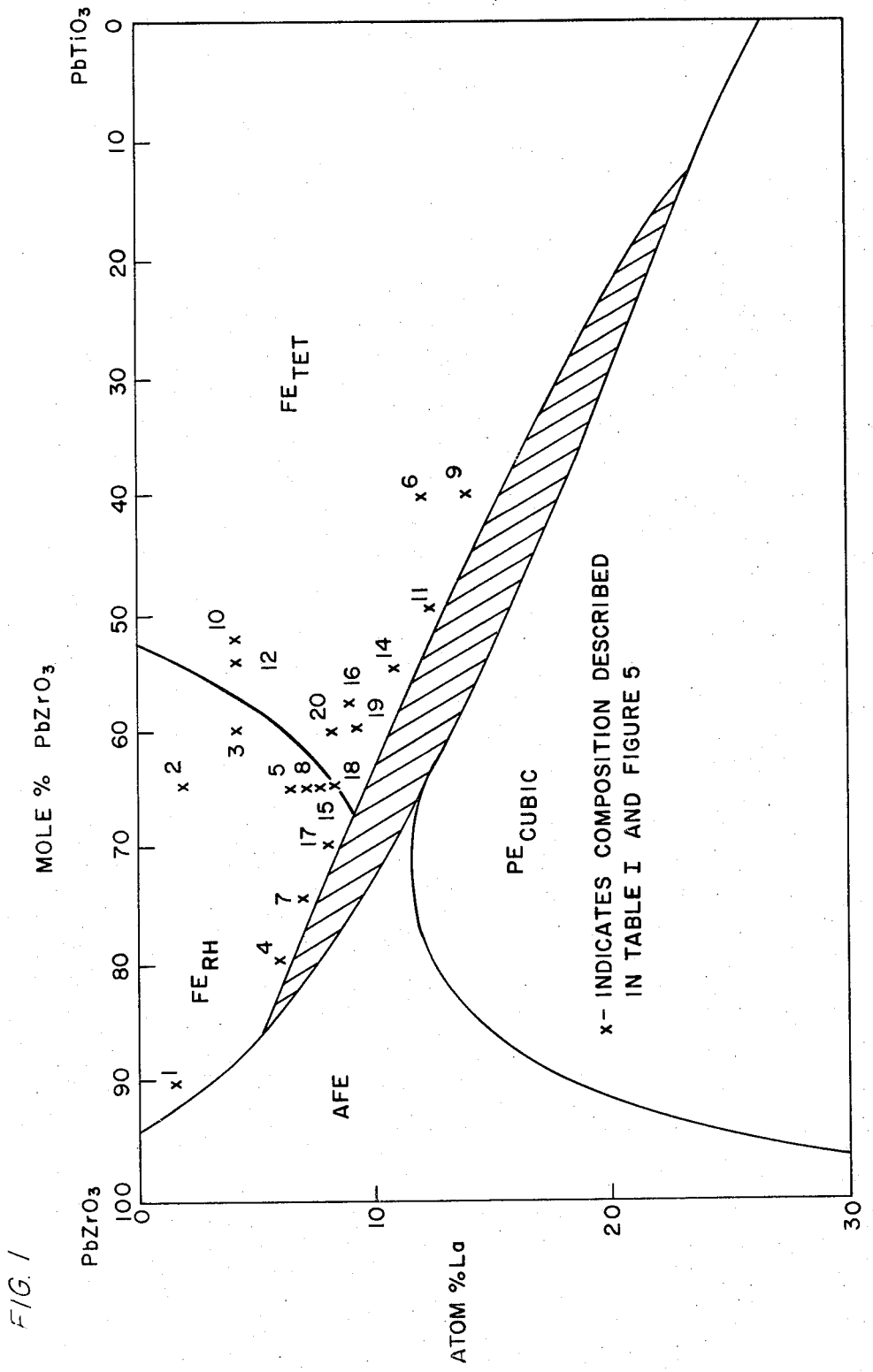
FIG. 1 shows the phase diagram of PLZT in the compositional range of interest.
Figure 2:
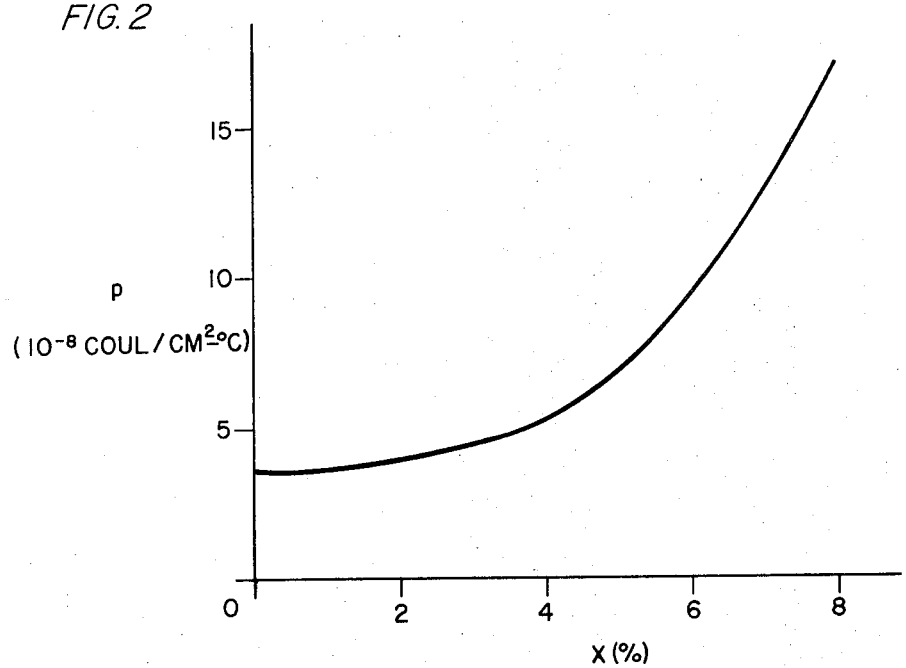
FIG. 2 shows the pyroelectric coefficient $p$ of various samples of PLZT having different $x$ values.

FIG. 1 shows a room temperature phase diagram of PLZT. The four phases shown are the Paraelectric Cubic ($PE_{cubic}$), the Antiferroelectric (AFE), the ferroelectric Rhombohedral ($FE_{RH}$), and the ferroelectric tetragonal ($FE_{TET}$). Certain ferroelectric rhombohedral and tetragonal PLZT compositions have been found to be particularly advantageous pyroelectric detector materials.

For the purpose of this specification, the designation $x/y/z$ will be used to describe various PLZT compositions. For example, 8/65/35 describes PLZT having $x = 0.08$ (8 percent) and a $y$ to $z$ ratio of 65 to 35.

Pyroelectric Coefficient ($p$)

To evaluate the suitability of a pyroelectric material for use in a pyroelectric detector a number of physical properties must be measured. One important property is the pyroelectric coefficient $p$. Measurement of the pyroelectric coefficient $p$ of materials within the compositional range of the present invention were accomplished in the following manner. Discs of hot-pressed rhombohedral and tetragonal ferroelectric PLZT were prepared. The various discs had $x$ values of between about 0.015 (1.5 percent) and about 0.14 (14 percent). The ratio of $y$ to $z$ ranged between 40 to 60 and 90 to 10. Thin samples about 80 microns thick were prepared for the measurements. Surface strain caused by polishing of the samples was relieved by annealing the samples in air at 650°C for 20 minutes to 1 hour. Aluminum contacts were vacuum deposited onto both surfaces of the samples and then the samples were poled before measurement of the pyroelectric coefficient. The samples were suspended in air by a small wire and the pyroelectric signal produced by the various samples was measured using a calibrated 500°K black body source modulated sinusoidally at various frequencies by a mechanical chopper.

The sinusoidal modulation of the radiation was performed by passing the radiation through a circular aperture of diameter $2R$. The radiation was interrupted as it passed through the circular aperture by rectangular chopper teeth of the mechanical chopper. The separation between the chopper teeth was $2r$, where the ratio $R/r$ equaled approximately 0.87. This technique for sinusoidal modulation was described by R. McQuistan in J. of Opt. Soc. of America 48, 63–66 (1958).

The power of the modulated radiation is given by $$P(t) = I_o (1 - \cos\omega t/2), \qquad 1$$

where
$I_o = \pi R^2 \sigma (T_b^4 - \epsilon_c T_c^4),$  (2)
$\sigma$ = Stefan-Boltzmann constant,
$\epsilon_c$ = emissivity of the chopper,
$T_b$ = blackbody temperature, and
$T_c$ = chopper temperature
$\omega = 2\pi \times$ frequency.

The power received by a pyroelectric element of area $A$ at a distance of $l$ away from the radiation source is then $$\eta P'(t) = (A/2\pi l^2) \eta I_o (1 - \cos\omega t/2) = \eta P_o (1 - \cos\omega t/2), \qquad 3$$

where
$\eta$ = absorption coefficient of the electrode exposed to the radiation.

The temperature change of the pyroelectric element is then described by a first order differential equation $$H(d/dt)(\Delta T) + G(\Delta T) = \eta P_o (1 - \cos\omega t/2) \qquad 4$$

and $$\Delta T(0) = 0 \qquad 5$$

where
$H$ = heat capacity of the sample = $c\rho A d$
$G$ = heat conductance of the sample
$c$ = specific heat,
$\rho$ = density,
$d$ = thickness of the elements,
$A$ = area of the element, and
$\Delta T$ = temperature change.

The complete solution to equation 4 is $$\Delta T = (\eta P_o/2H) [t_T/(1+\omega^2 t_T^2)] [1 + \omega^2 t_T^2 - \cos\omega t - \omega t_T \sin\omega t - \omega^2 t_T^2 e^{-t/t_T}] \qquad 6$$

where $t_T = H/G$ = thermal time constant.
It is well known that the pyroelectric current $i$ is defined by $$i = pA (d/dt)(\Delta T). \qquad 7$$

By substituting equation 6 into equation 7 and solving, it can be seen that $$i = (\eta p P_o A/2H) [\omega t_T/(1+\omega^2 t_T^2)^{1/2}][\sin(\omega t - \phi) + [\omega t_T/(1 + \omega^2 t_T^2)^{1/2}]e^{-t/t_T}] \qquad 8$$

where
$p$ = pyroelectric coefficient, and $$\phi = \tan^{-1}(\omega t_T).$$

The steady-state solution of equation 8 as $t \to \infty$ is $$i_s = (\eta p A P_o/2H) [\omega t_T/(1 + \omega^2 t_T^2)^{1/2}]\sin(\omega t - \phi). \qquad 8a$$

The rms voltage $V_{rms}$ developed across the detector is $$V_{rms} = i_{s_{rms}} (1/|Y_t|) \qquad 9$$

$$= (\eta p A P_o/2\sqrt{2}\, H) [\omega t_T/(1 + \omega^2 t_T^2)^{1/2}][R/(1 + \omega^2 R^2 C^2)^{1/2}]$$

where $Y_t$ is the admittance, and $R$ and $C$ are the equivalent resistive and capacitance components respectively of the pyroelectric element.

It is easy to show that if $(\omega t_T)^2 >> 1$, $\omega^2 R^2 C^2 >> 1$, $$p \approx 2c\rho\omega\epsilon\epsilon_o/\eta(P_o/A \sqrt{2}) V_{rms} \qquad 10$$

where $\epsilon$ is the dielectric constant and $\epsilon_o$ is a conversion factor. The condition that $(\omega t_T)^2 >> 1$ is achieved by causing the sample to have a long thermal time constant $t_T$. This is accomplished by providing a low thermal conductivity substrate such as glass for the sample. The second requirement, that $\omega^2 R^2 C^2 >> 1$ is met by PLZT samples because PLZT has a large dielectric relaxation time.

It is possible to determine the pyroelectric coefficient $p$ of the various samples by measuring the various easily measured quantities shown in equation 10. FIG. 1 shows the value of the pyroelectric coefficients of various samples of PLZT having a ratio of $y$ to $z$ of 65 to 35 and having various $x$ values of between zero and 0.08. It can be seen that the value of the pyroelectric coefficient $p$ increases rapidly as the value of $x$ approaches 0.07. The magnitude of the pyroelectric coefficient of 8/65/35 PLZT is larger than in any other ceramic ferroelectric and is exceeded in single crystal ferroelectrics only by certain compositions of SBN. In all measurements in the x/65/35 compositions the top electrode of the sample was blackened such that $\eta \approx 1$ and the sample was placed at a distance of 35 centimeters from the blackbody source.

Detectivity (D*)

Although a large pyroelectric coefficient p gives some indication that a pyroelectric material may be useful in pyroelectric detectors, it does not, in and of itself, provide a figure of merit from which it can be stated that the pyroelectric material is a desirable detector material. Rather, the common figure of merit utilized in evaluating radiation detectors is the detectivity D*. As will be shown, the pyroelectric coefficient p is but one factor determining the detectivity of a pyroelectric detector.

It is well known that the detectivity of a detector may be shown as $$D^* = [R_v A^{1/2} (\Delta f)^{1/2}/(\overline{V_N^2})^{1/2}], \qquad 11$$

where
$R_v$ = responsivity (in volts/watt),
$\Delta f$ = bandwidth, and
$V_N$ = noise voltage.

The first step in determining D* of a detector material is to determine the noise and the signal.

Figure 3:
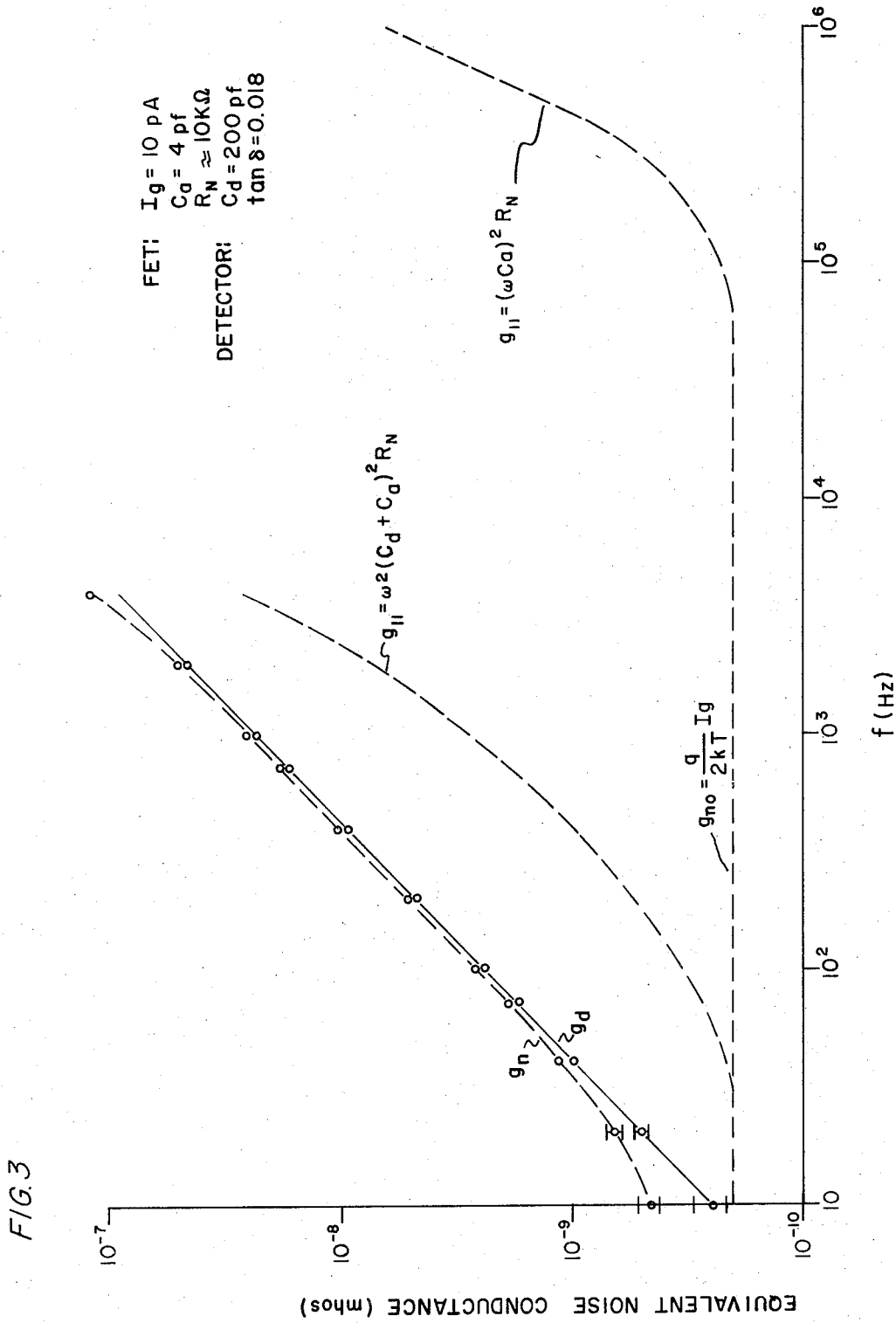
FIG. 3 shows the equivalent noise conductance of a PLZT pyroelectric detector and FET amplifier as a function of frequency.

Several noise sources are possible in pyroelectric detectors; namely, radiation noise, temperature fluctuation noise, thermal noise of the detector, and noises of the amplifier. The contributions of these noise sources have been discussed in detail by A. van der Ziel and S. T. Liu in *Physica*, 61, 589–593 (1972). Since radiation noise and temperature fluctuation noise are negligible, the total noise current at a spot frequency is $$\overline{i_n^2} = 4kt [g_d + g_c + (q/2kt)(I_{g_1} + I_{g_2}) + R_n |Y_t|^2] \qquad 12$$

where
$k$ = Boltzmann constant
$T$ = absolute temperature
$g_d$ = detector conductance = $(\omega \epsilon \epsilon_o \tan\delta) A/d$
$\tan\delta$ = loss factor of the pyroelectric detector
$g_c$ = load conductance
$q$ = electronic charge
$I_{g_1}, I_{g_2}$ = FET gate currents
$R_n$ = equivalent noise resistance of the FET
$Y_t$ = the total circuit admittance $\approx \omega(C_d + C_a)$
$C_a$ = FET amplifier input capacitance
$C_d$ = detector capacitance The equivalent noise conductance, $g_n$, then may be described as $$g_n = g_d + g_c + (q/2kt)(I_{g_1} + I_{g_2}) + R_n |Y_t|^2 = g_d + g_c + g_{no} + g_{11} \qquad 13$$

where
$g_{no} = (q/2kt)(I_{g_1} + I_{g_1})$, and
$g_{11} = R_n |Y_t|^2 \approx (\omega(C_d + C_a))^2 R_n$ For example, with a 6.5/65/35 PLZT detector having $C_d$ = 200pf and an FET amplifier having $I_g$ = 10pA, $C_a$ = 4pf, and $R_n \approx$ 10kohm, the noise characteristics are shown in FIG. 3. It can be directly seen from FIG. 3 that between about 50Hz and about 1KHz the detector is thermal noise limited. With currently available FET's having lower $I_g$ and $C_a$, it is possible to show that the detector is thermal noise limited (that is $g_n \approx g_d$) over the entire frequency range of interest (1Kz – 1KHz).

Since the pyroelectric material can be characterized as a parallel circuit comprising a frequency dependent resistance $R = 1/g_d$ and a capacitor $C_d$, the noise voltage $V_N$ can be shown to be $$(\overline{V_N^2})^{1/2} = (\overline{i_d^2})^{1/2} (1/|Y_t|), = (4kt\omega\epsilon\epsilon_o(\tan\delta)(A/d)\Delta f)^{1/2} [R/(1 + \omega^2 R^2 C_d^2)^{1/2}] \qquad 14$$

provided $C_d \gg C_a$.

The noise properties of each of the samples described above were measured using a high impedance low noise amplifier with a known noise source as a calibration. It was found that all of the samples exhibited thermal noise.

As can be seen from equation 11, in order to determine the detectivity D*, it is necessary to know the responsitivity $R_v$. It can be shown that $$R_v = V_o - \text{peak}/p_o/2 = \sqrt{2} V_{rms}/p_o/2$$
$$= 1/d \; \eta p/c\rho \; [\omega t_T/(1 + \omega^2 t_T^2)^{one-half}] \; [R/(1 + \omega^2 R^2 C^2)^{one-half}] \qquad 15$$

D* can now be determined by substituting equations 14 and 15 into equation 11. This yields $$D^* = \eta p/c\rho(1/d^{one-half}) [1/(\epsilon\tan\delta)^{one-half}] \omega t_T/1 + \omega^2 t_T^2 \; ^{one-half} [1/(4kT\omega\epsilon_o)^{one-half}] \qquad 16$$

By inspecting equation 16, it is clear that the figure of merit of a pyroelectric detector depends on five material parameters. These parameters are the pyroelectric coefficient p, the mechanical properties of density $\rho$ and specific heat c, and the dielectric properties in dielectric constant $\epsilon$ and dielectric loss factor $\tan\delta$. It is important to note that the product of the density $\rho$ and the specific heat c is almost a constant in PLZT ferroelectric ceramics. Thus the material parameters of importance in determining detectivity are the pyroelectric coefficient p, the dielectric constant $\epsilon$, and the dielectric loss factor $\tan\delta$.

Table I shows the average room temperature pyroelectric properties of various samples of PLZT. Several samples of the same composition formed by different methods were investigated. The values listed represent the average values of the particular composition. The samples are arranged in order of increasing dielectric constant. The dielectric properties of the various samples of PLZT were measured by a GR–1620 capcitance bridge. The sample numbers listed in Table I correspond to the numbered compositions in FIG. 1.

Figure 4:
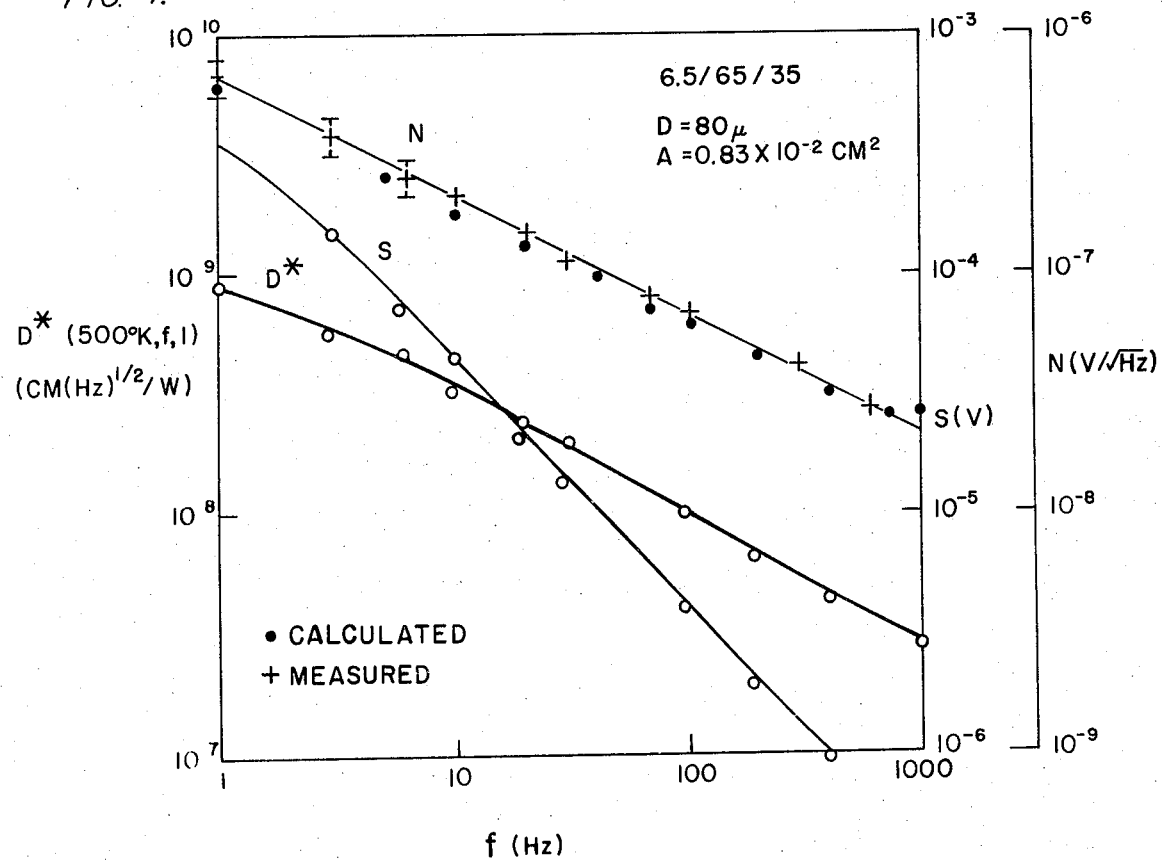
FIG. 4 shows signal, noise, and detectivity of a PLZT pyroelectric detector.

FIG. 4 shows the signal, noise, and detectivity as a function of frequency for a PLZT pyroelectric detector having $x$ = 0.065 and a y to z ratio of 65 to 35. The detector had a thickness of 80 microns and an area of 0.83 × 10$^{-2}$cm². The signal was measured by means of the same calibrated blackbody source used to measure the pyroelectric coefficient, but with a variable speed chopper. Both the signal and noise decreases with increasing frequency, but the noise did not decrease as fast as 1/f so that the detectivity was frequency dependent. At 100Hz, the detector had a detectivity of approximately 1 × 10$^8$ cm Hz½/W.

Discovery of Pyroelectric Material Constant

Figure 5:
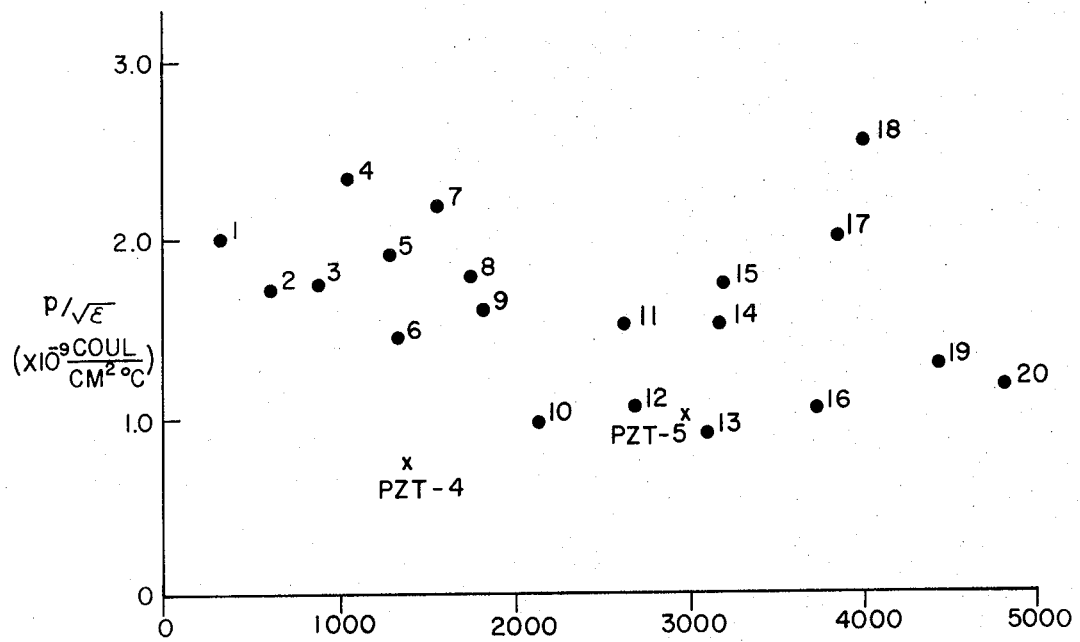
FIG. 5 shows $p/\sqrt{\epsilon}$ as a function of $\epsilon$ for various PLZT compositions and for various pyroelectric materials.

Studies of various PLZT samples, including materials in both the rhombohedral and tetragonal ferroelectric phases, indicates that $p/\sqrt{\epsilon}$ behaves essentially like a constant, even though p varies from 3.5 × 10$^{-8}$ to 17.6 × 10$^{-8}$ and $\epsilon$ varies from 305 to 4,700. FIG. 5 shows the

TABLE I

Room Temperature Properties of PLZT (300°K)

| Sample No. | Compositions | $\epsilon$ | $p(\times 10^{-8}$ coul$)/cm^2$°C | $\tan\delta$ (%) | $D^*$ (500, 30, 1) ($\times 10^8$cm(Hz)/w) |
|---|---|---|---|---|---|
| 1 | 1.5/90/10 | 305 | 3.5 | 2.10 | 1.11 |
| 2 | 2/65/35 | 600 | 4.45 | 1.86 | 1.00 |
| 3 | 4/60/40 | 857 | 5.14 | 2.36 | 0.93 |
| 4 | 6/80/20 | 1010 | 7.55 | 0.88 | 2.08 |
| 5 | 6.5/65/35 | 1260 | 6.80 | 1.75 | 1.17 |
| 6 | 12/40/60 | 1270 | 5.13 | 0.74 | 2.47 |
| 7 | 7/75/25 | 1500 | 8.40 | 0.95 | 1.83 |
| 8 | 7/65/35 | 1726 | 7.40 | 0.76 | 1.66 |
| 9 | 14/40/60 | 1800 | 6.90 | 1.00 | 1.17 |
| 10 | 4/52/48 | 2098 | 4.26 | 1.03 | 0.73 |
| 11 | 12/50/50 | 2550 | 7.62 | 1.1 | 1.17 |
| 12 | 4/54/46 | 2610 | 5.20 | 1.65 | 0.64 |
| 13 | 7/56/44 | 3088 | 5.00 | 1.14 | 0.69 |
| 14 | 11/55/45 | 3130 | 8.30 | 1.20 | 1.11 |
| 15 | 7.5/65/35 | 3158 | 9.70 | 1.01 | 1.40 |
| 16 | 9/58.7/41.3 | 3700 | 6.78 | 1.09 | 0.86 |
| 17 | 8/70/30 | 3800 | 12.5 | 2.00 | 1.15 |
| 18 | 8/65/35 | 3980 | 16.1 | 2.46 | 1.28 |
| 19 | 9/60/40 | 4378 | 8.53 | 1.46 | 0.86 |
| 20 | 8/60/40 | 4763 | 8.16 | 2.03 | 0.68 | measured $p/\sqrt{\epsilon}$ as a function of $\epsilon$ for a large number of PLZT samples. These samples included material in both the rhombohedral phase and the tetragonal phase. The sample numbers shown in FIG. 5 correspond to the sample numbers used in FIG. 1 and Table I. In addition, $p/\sqrt{\epsilon}$ has been plotted as a function of $\epsilon$ for two Lead Zirconate Titanate samples, PZT-4 and PZT-5. The data for PZT-4 was obtained from R. J. Mahler, et al., *Infrared Physics*, 12, 57 (1972), and the data for PZT-5 was obtained from S. B. Lang, *Review of Scientific Instruments*, 36, 1817 (1965).

Figure 6:
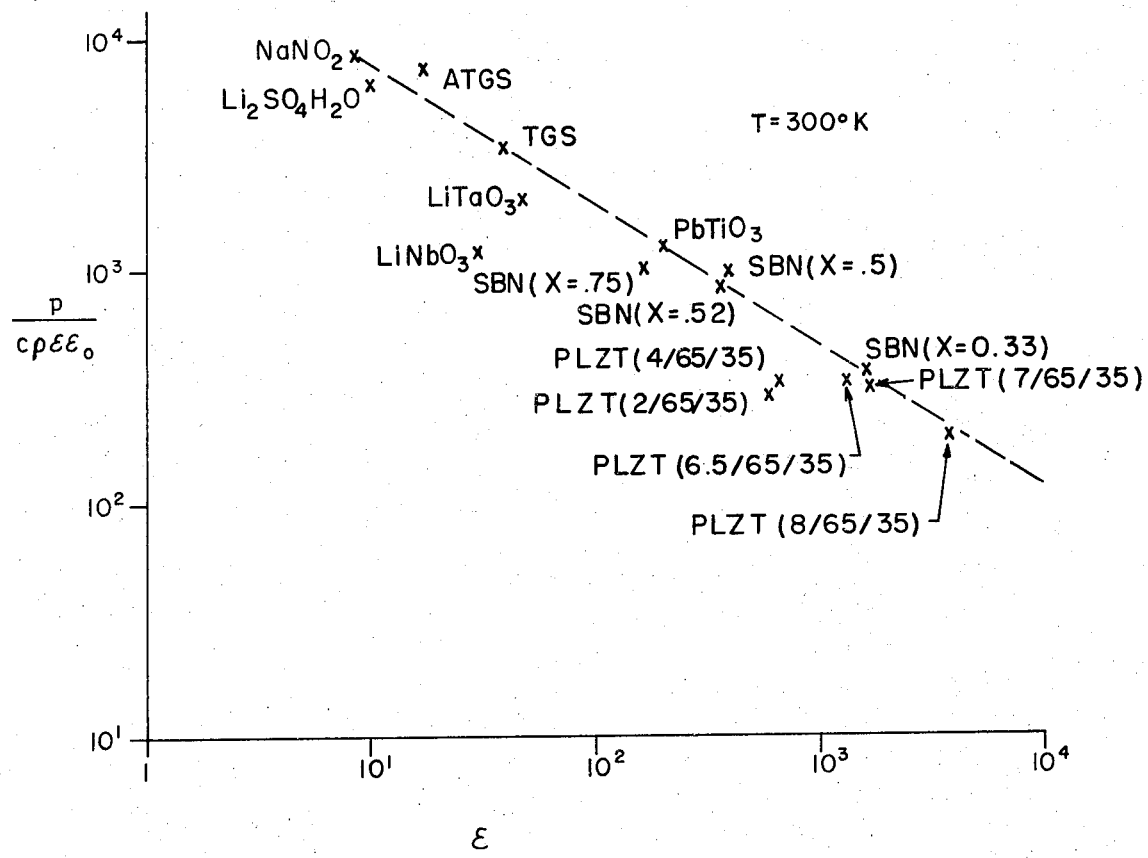
FIG. 6 shows $p/c\rho\epsilon\epsilon_0$ as a function of 68 for various pyroelectric materials.

FIG. 6 also indicates that $p/\sqrt{\epsilon}$ is essentially a constant for a large variety of pyroelectric materials. The quantity $p/c\rho\epsilon\epsilon_0$ measured at 300°K is plotted on a log-log scale as a function of $\epsilon$. The slope of the line upon which the various values are centered has a slope of approximately $-\frac{1}{2}$. This indicates that $p/\sqrt{\epsilon}$ is essentially a constant. It is believed that the scattering of points in FIG. 5 can be explained by variation in $c\rho$ and nature of transitions (either first order-like or second order-like phase transition).

Rhombohedral PLZT

It can be seen from FIG. 5 that $p/\sqrt{\epsilon}$, and therefore detectivity, is generally a factor of two higher in rhombohedral PLZT than in tetragonal PLZT. One possible explanation for this difference in properties of rhombohedral and tetragonal PLZT is shown in FIGS. 7 and 8.

Figure 7A:
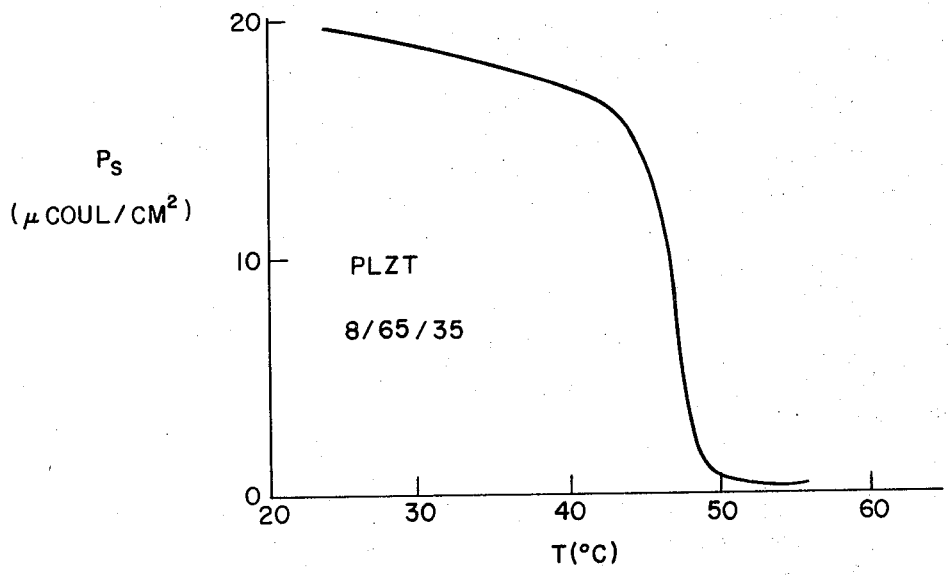
FIGS. 7a and 7b show the temperature dependence of the spontaneous polarization and the pyroelectric current of 8/65/35 PLZT.
Figure 7B:
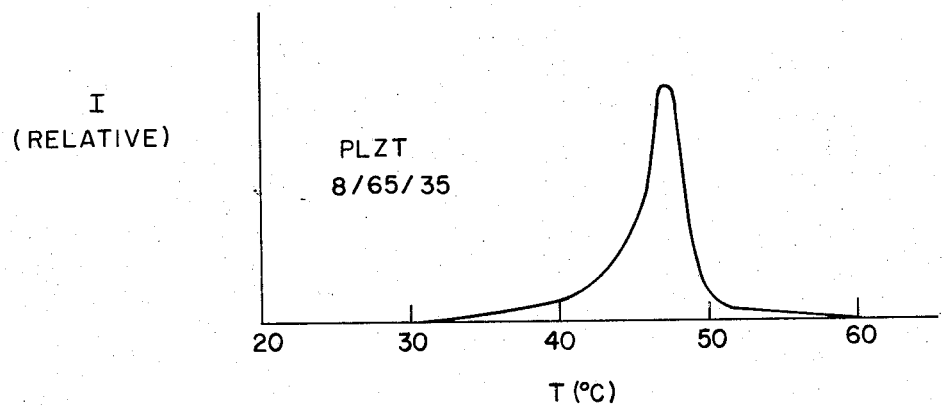

FIG. 7a shows the temperature dependence of the spontaneous polarization $P_s$ as a function of temperature for a sample of rhombohedral PLZT (8/65/35). FIG. 7b shows the pyroelectric current of the same sample as a function of temperature. It can be seen that the temperature dependence of the pyroelectric properties of the rhombohedral PLZT sample behaves like a second order phase transition.

Figure 8A:
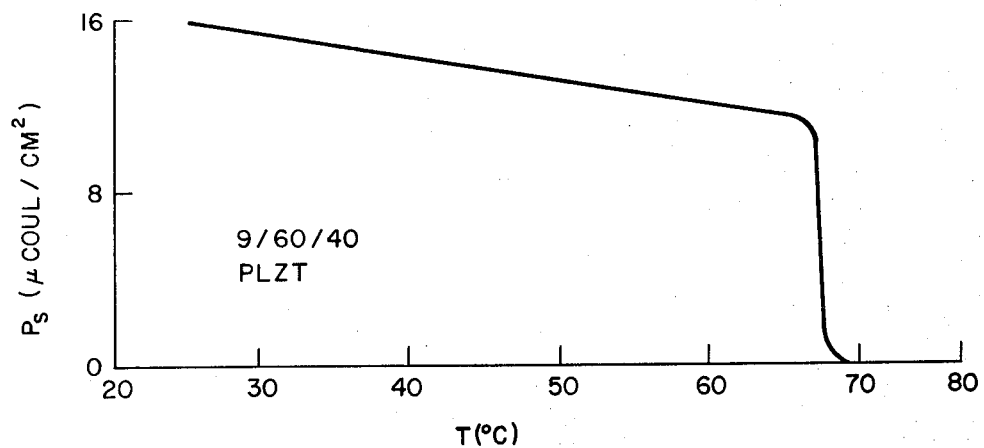
FIGS. 8a and 8b show the temperature dependence of the spontaneous polarization and the pyroelectric current of 9/60/40 PLZT.
Figure 8B:
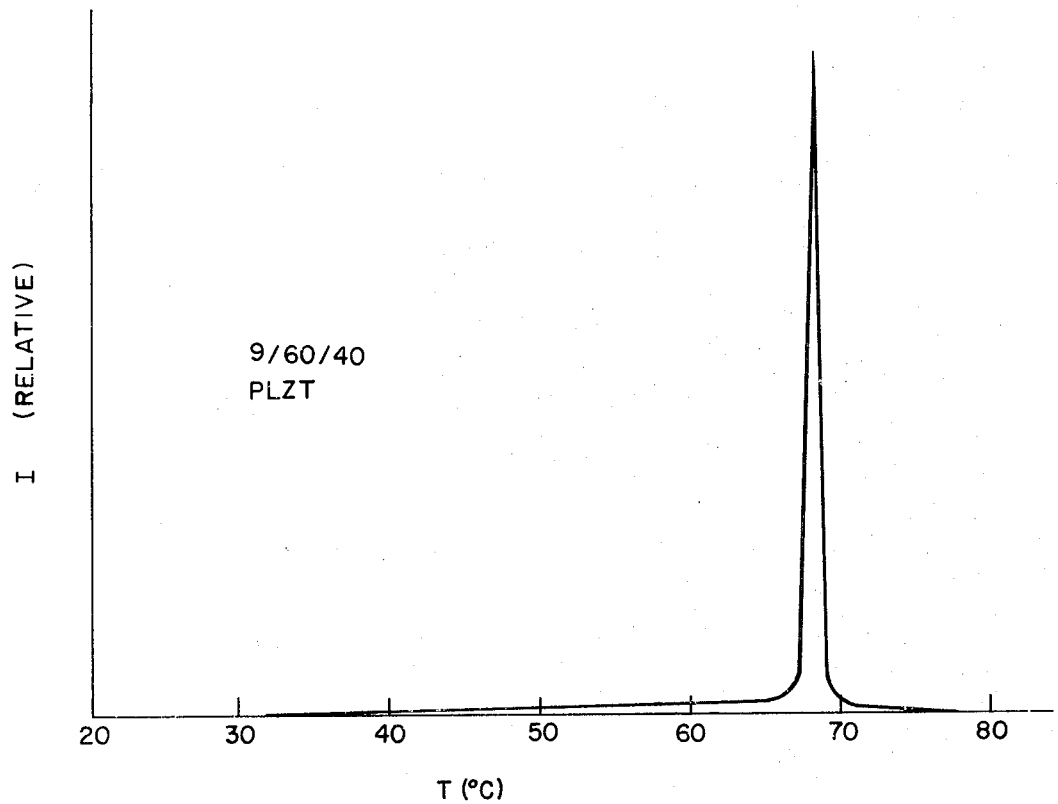

FIG. 8a and 8b show the temperature dependence of the spontaneous polarization $P_s$ and the pyroelectric current of a sample of tetragonal PLZT (9/60/40). Unlike the rhombohedral sample, the tetragonal PLZT sample exhibits first order-like phase transition characteristics.

It is believed that the larger pyroelectric coefficient in rhombohedral PLZT is because rhombohedral PLZT exhibits a second order-like rather than a first order-like phase transition. It should be remembered that the pyroelectric coefficient $p$ is equal to the change in spontaneous polarization $\Delta P_s$ divided by the change in temperature $\Delta T$. In general, the slope of $\Delta P_s/\Delta T$ at room temperature will be greater in a second order of phase transition material than in a first order phase transition material having the same dielectric constant. Thus, $p/\sqrt{\epsilon}$ will be greater in the second order material than in the first order material.

Rhombohedral PLZT ceramic has extremely attractive properties as a pyroelectric detector material. With the unexpected and highly significant discovery that $p/7\epsilon$ is substantially constant for a large variety of pyroelectric materials, the advantages of PLZT become very important.

One extremely attractive property of PLZT is the high dielectric constant of certain PLZT compositions. Since $p/\sqrt{\epsilon}$ is essentially constant for a wide variety of rhombohedral ferroelectric PLZT samples, it is very advantageous to use rhombohedral PLZT having a high dielectric constant. A higher dielectric constant will result in a lower impedance and small size pyroelectric detector. This lower impedance allows the use of electronics for amplification of the pyroelectric signals that do not have to meet requirements which are as stringent as the electronics utilized with low dielectric constant, high impedance single crystal pyroelectric materials such as TGS. The preferred ferroelectric rhombohedral PLZT pyroelectric detectors of a dielectric constant greater than about 1,000. These materials fall within the compositional range of $x$ greater than about 4 percent and a $y$ to $z$ ratio of between about 60 to 40 and about 80 to 20.

Of particular importance are those compositions of rhombohedral PLZT having a dielectric constant greater than about 3,000. These compositions correspond to $x$ greater than about 6 percent and the $y$ to $z$ ratio between about 60 to 40 and about 70 to 30. As is shown in FIG. 4, the rhombohedral PLZT materials having dielectric constants greater than about 3,000 also exhibit very high pyroelectric coefficients, thus resulting in the highest $p/\sqrt{\epsilon}$ value of all of the PLZT materials. The high pyroelectric coefficients and high dielectric constants of these materials enable large scale, small element pyroelectric detector arrays to be fabricated. In addition to the highly advantageous electrical properties, these PLZT materials are particularly suitable for large scale arrays because large bodies of PLZT ceramic are much easier to prepare than large bodies of conventional single crystal pyroelectric detector materials.

The most preferred PLZT compositions have $\epsilon$ of greater than about 3,600. These compositions correspond to an $x$ greater than about 7 percent and a $y$ to $z$ ratio of between about 62 to 38 and about 70 to 30.

The discovery that $p/\sqrt{\epsilon}$ is essentially constant for a large variety of pyroelectric detector materials indicates that the most significant material property affecting detectivity is the loss factor $\tan\delta$. As would be expected, a ceramic material such as PLZT will generally exhibit a slightly higher loss than a single crystal material. It is possible, however, to reduce the dielectric loss factor of PLZT by changing the material processing parameters. Thus further improvement in the detectivity $D^*$ of PLZT pyroelectric detectors is possible with improved processing.

Another significant advantage of PLZT is that it is a hot-pressed ceramic material. It is therefore possible to produce large quantities of PLZT at extremely low cost by batch process fabrication. For example, discs of PLZT of greater than 2 inches in diameter have been made. This is much larger than any currently available single crystal pyroelectric material. In general, single crystal pyroelectric detector material requires more difficult and expensive preparation techniques.

Still another advantage of PLZT is a result of its ceramic nature. As a ceramic, PLZT exhibits very good mechanical strength, which allows PLZT pyroelectric detectors to be fabricated by low cost batch processes.

Another advantage of PLZT is its relatively high Curie temperature. Various compositions of PLZT have Curie temperatures in the range of about 110°C to about 365°C. This allows PLZT to sense relatively high temperatures without danger of depoling.

Tetragonal PLZT

In general, it has been found that tetragonal ferroelectric PLZT exhibits a pyroelectric coefficient which is about a factor of two lower than the pyroelectric coefficient of a rhombohedral phase ferroelectric PLZT material having the same dielectric constant. As described previously, it is believed that this difference in pyroelectric coefficients is due to the first order-like phase transition of tetragonal PLZT, while rhombohedral PLZT exhibits a second order-like phase transition. As a result of the lower pyroelectric coefficient, a tetragonal phase PLZT pyroelectric detector will exhibit lower detectivity than a rhombohedral phase PLZT pyroelectric detector.

In some applications, it is desirable or necessary that the pyroelectric detector operate over a large range of operating temperatures. It is in this application that tetragonal PLZT pyroelectric detectors are particularly suited. It should be recalled that the pyroelectric coefficient is defined as $\Delta P_s/\Delta T$. The pyroelectric coefficient thus may change depending upon the operating temperature of the detector. This is particularly true in second order phase transition materials. There is less variation in the pyroelectric coefficient with various operating temperatures in tetragonal PLZT. It is believed that this temperature stability is due to the first order-like transition of tetragonal PLZT. For example, it has been found that certain tetragonal PLZT samples exhibit a substantially constant pyroelectric coefficient over an operating temperature range of ±100°C. In those applications requiring stability of pyroelectric properties over a wide range of operating temperatures, tetragonal PLZT pyroelectric detectors are particularly suited. This temperature stability comes at the cost of somewhat lower detectivity.

The preferred tetragonal PLZT detector materials have a dielectric constant greater than 1,000. These compositions correspond to a lanthanum content of greater than about 4 percent. The advantages of a detector having a high dielectric constant has been previously discussed. Ferroelectric tetragonal PLZT materials having a dielectric constant greater than about 3,000 have a lanthanum content of greater than about 6 percent.

Fabrication of Single Element Pyroelectric Detectors

The excellent mechanical strength of PLZT ceramic allows PLZT pyroelectric detectors to be made by low cost batch processes. One successful batch process consists of the following steps. First, the PLZT disc is lapped to a thickness of between 3 to 5 mils. Second, a silver or platinum paste is uniformly coated on both sides of the disc. The silver or platinum layers thus deposited form the electrodes of the resulting pyroelectric detectors. Third, the disc is fired at 550° to 650°C. The firing provides annealing of the material to relieve mechanical strain caused by lapping. In addition, the firing ensures that the silver or platinum layers make good electrical contact to the PLZT. Fourth, the disc is diced to yield a large number of pyroelectric detectors. In one preferred method, the dicing is performed by an ultrasonic chuck containing a large number of detector size holes. Fifth, the detector may be mounted on a substrate, such as glass. If the finished detector size is 1 by 1mm, it is estimated that greater than 100 detectors can be obtained from a single 2-inch diameter disc by the use of this method.

PLZT Pyroelectric Detector Arrays

As has been described in previous sections, PLZT is particularly suited for the fabrication of large scale, small element pyroelectric detector arrays. The advantage of a high dielectric constant, small area pyroelectric detector resides in the effect of detector capacitance $C_d$ upon signal and noise. In practice, the pyroelectric detector is connected to an FET amplifier having an input capacitance $C_a$ of a few picofarads. The input capacitance $C_a$ tends to shunt the pyroelectric voltage $V$ developed on $C_d$. The voltage $V'$ seen by the FET amplifier at its input is given by $$V = V'[1 + (C_a/C_d)].$$

17

To obtain maximum signal from the detector at the input of the FET amplifier, $C_d$ must be much larger than $C_a$.

Since the detector capacitance $C_d$ is defined as $C_d = \epsilon\epsilon_o A/d$, it is possible to increase $C_d$ by increasing the dielectric constant $\epsilon$, the area $A$, or by decreasing the thickness $d$ of the detector. The thickness generally may not be reduced much below 25 microns due to physical damage which occurs during the thinning process.

The detector capacitance $C_d$ may not be increased without limit, however, because of noise considerations. An increase in the detector capacitance $C_d$ substantially increases the noise conductance $g_{11}$, since $$g_{11} = \omega^2(C_a + C_d)^2 R_N.$$

It therefore becomes essential to properly select $\epsilon$ and $A$ such that $C_d >> C_a$ and yet $g_{11}$ does not become the dominant noise. For a small area pyroelectric detector, it is essential to have a high dielectric constant so that $C_d >> C_a$ is achieved. Since $p/\sqrt{\epsilon}$ is approximately constant, small area high dielectric constant PLZT detectors have performance comparable to large area low dielectric constant pyroelectric detectors such as TGS. For example, a PLZT pyroelectric detector having a thickness $d = 80$ microns, the area of individual detector elements is preferably less than 1,000 microns by 1,000 microns when $\epsilon$ is about 4,000, less than 1,500 microns by 1,500 microns when $\epsilon > 3,000$, and less than 2,000 microns by 2,000 microns when $\epsilon > 1,000$. In each case, the preferred minimum area of an individual element is about 25 microns by 25 microns. The preferred element size is about 100 microns by 100 microns.

Figure 9B:
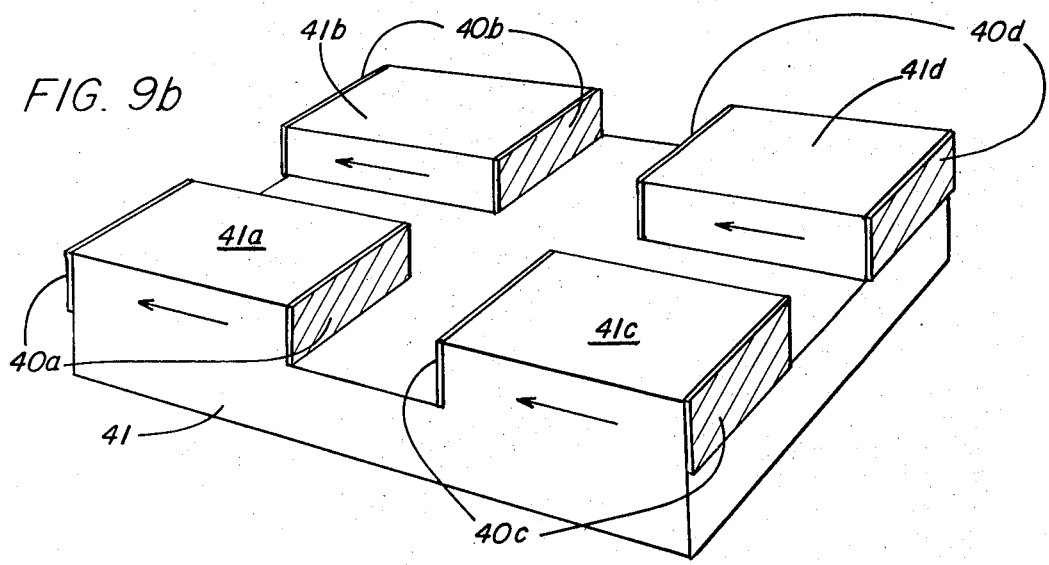
FIGS. 9a and 9b show pyroelectric detector arrays.
Figure 9A:
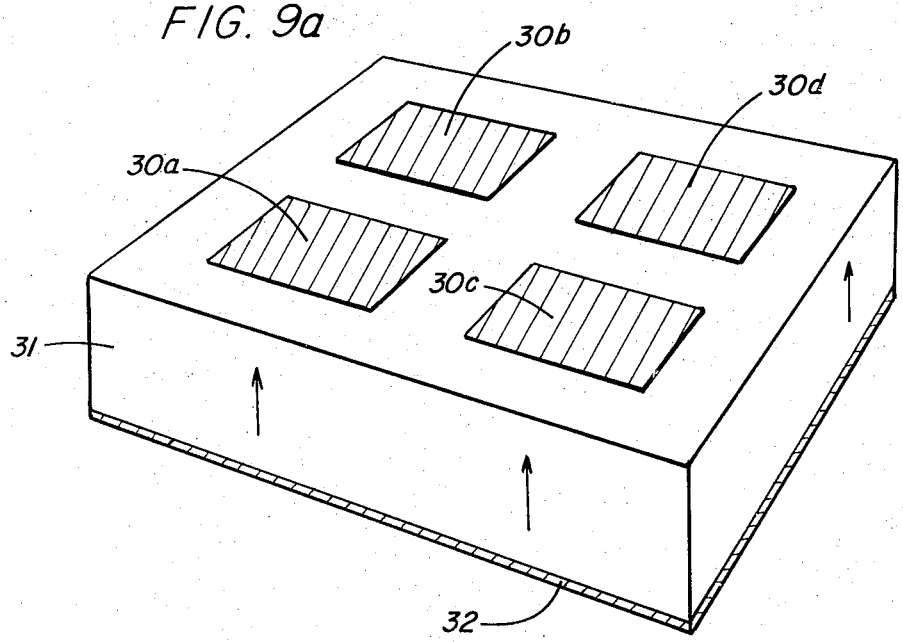

FIGS. 9a and 9b show two PLZT pyroelectric detector arrays. For illustrative purposes, each of the arrays contain four elements. It should be understood, however, that arrays having many more elements are possible.

In FIG. 9a a plurality of electrodes 30a, 30b, 30c, and 30d are attached to one surface of a PLZT body 31. A common electrode 32 is attached to the opposite surface. The electrically poled regions between each of the electrodes 30a – 30d and common electrode 32 comprise pyroelectric detector elements. It may be desirable to cut a groove between the individual elements to provide improved electrical isolation.

In FIG. 9b, four electrically poled mesa-like regions 41a–41d have been formed in PLZT body 41. Electrode pairs 40a–40d are attached to opposite surfaces of each of the regions.

Conclusion

While this invention has been disclosed with particular reference to the preferred embodiments, it will be understood by those skilled in the art the changes in form and detail may be made without departing from the spirit and scope of the invention. It should be noted that the detectivity $D^*$ is dependent on the thickness $d$ of the detector. Although the samples tested had a thickness of 80 microns, it will be understood by the skilled workers that $D^*$ can be still further increased by decreasing the thickness, preferably to a thickness on the order of 25 microns.

The embodiments of the invention in which an exclusive property or right is claimed are defined as follows:

1. A pyroelectric detector having a high detectivity $D^*$, the pyroelectric detector comprising:

an electrically poled body of rhombohedral ferroelectric $Pb_{1-x}La_x(Zr_yTi_z)_{1-x/4}O_3$, wherein $x$ is greater than about 0.015 and $y + z = 1$, electrode means attached to the body, and amplification means connected to the electrode means to amplify the pyroelectric signal from the body.

2. The pyroelectric detector of claim 1 wherein the body has a dielectric constant $\epsilon$ of greater than about 1,000.

3. The pyroelectric detector of claim 2 wherein $x$ is greater than about 0.04.

4. The pyroelectric detector of claim 3 wherein the $y$ to $z$ ratio is between about 60 to 40 and about 80 to 20.

5. The pyroelectric detector of claim 2 wherein the body has a dielectric constant $\epsilon$ of greater than about 3,000.

6. The pyroelectric detector of claim 5 wherein $x$ is greater than about 0.06.

7. The pyroelectric detector of claim 6 wherein the $y$ to $z$ ratio is between about 60 to 40 and about 70 to 30.

8. The pyroelectric detector of claim 5 wherein the body has a dielectric constant of greater than about 3,600.

9. The pyroelectric detector of claim 8 wherein the $y$ to $z$ ratio is between about 62 to 38 and about 70 to 30.

10. The pyroelectric detector of claim 9 wherein $x$ is greater than about 0.07.

11. The pyroelectric detector of claim 1 and further comprising chopper means for modulating radiation incident the body.

12. The pyroelectric detector of claim 1 wherein the body does not exhibit self-depoling and is thermal noise limited.

13. The pyroelectric detector of claim 1 wherein the body has a thickness of between 3 mils and 5 mils.

14. The pyroelectric detector of claim 1 wherein the electrode means are silver layers on opposite surfaces of the body.

15. The pyroelectric detector of claim 1 wherein $\epsilon$, the absorption coefficient of an electrode exposed to radiation, is approximately unity.

16. A small element pyroelectric detector array comprising:

a body of ferroelectric $Pb_{1-x}La_x(Zr_yTi_z)_{1-x/4}O_3$, wherein $x$ is greater than about 0.015 and $y + z = 1$, the body having a dielectric constant $\epsilon$ greater than about 1,000, a plurality of electrically poled regions of the body, electrode means attached to each of the plurality of electrically poled regions, and amplification means connected to the electrode means to amplify the pyroelectric signal from each of the plurality of electrically poled regions.

17. The pyroelectric detector array of claim 16 wherein $x$ is greater than about 0.04.

18. The pyroelectric detector array of claim 17 wherein the body is essentially in the rhombohedral phase.

19. The pyroelectric detector array of claim 18 wherein the $y$ to $z$ ratio is between about 60 to 40 and about 80 to 20.

20. The pyroelectric detector array of claim 16 wherein each of the plurality of electrically poled regions has an area of less than about 2,000 by 2,000 microns.

21. The pyroelectric detector array of claim 20 wherein each of the plurality of electrically poled regions has an area greater than about 25 by 25 microns.

22. The pyroelectric detector array of claim 21 wherein each of the plurality of electrically poled regions has an area of about 100 by 100 microns.

23. The pyroelectric detector array of claim 14 wherein the dielectric constant $\epsilon$ is greater than about 3,000.

24. The pyroelectric detector array of claim 23 wherein $x$ is greater than about 0.06.

25. The pyroelectric detector array of claim 24 wherein the body is essentially in the rhombohedral phase.

26. The pyroelectric detector array of claim 25 wherein the $y$ to $z$ ratio is between about 60 to 40 and about 70 to 30.

27. The pyroelectric detector array of claim 23 wherein each of the plurality of electrically poled regions has an area of less than about 1,500 by 1,500 microns.

28. The pyroelectric detector array of claim 27 wherein each of the plurality of electrically poled regions has an area greater than about 25 by 25 microns.

29. The pyroelectric detector array of claim 28 wherein each of the plurality of electrically poled regions has an area of about 100 by 100 microns.

30. The pyroelectric detector array of claim 23 wherein the dielectric constant $\epsilon$ is greater than about 3,600.

31. The pyroelectric detector array of claim 30 wherein $x$ is greater than about 0.07.

32. The pyroelectric detector array of claim 31 wherein the body is essentially in the rhombohedral phase.

33. The pyroelectric detector array of claim 32 wherein the $y$ to $z$ ratio is between about 62 to 38 and about 70 to 30.

34. A pyroelectric detector having stable pyroelectric detector properties over a large range of operating temperatures, the pyroelectric detector comprising:
  an electrically poled body of tetragonal ferroelectric $Pb_{1-x}La_x(Zr_yTi_z)_{1-x/4}O_3$, wherein $x$ is greater than about 0.015 and $y + z = 1$,
  electrodes attached to the body, and
  amplification means connected to the electrodes to amplify the pyroelectric signal from the body.

35. The pyroelectric detector of claim 34 wherein the body has a dielectric constant $\epsilon$ of greater than about 1,000.

36. The pyroelectric detector of claim 34 wherein $x$ is greater than about 0.04.

37. The pyroelectric detector of claim 35 wherein the dielectric constant $\epsilon$ is greater than about 3,000.

38. The pyroelectric detector of claim 37 wherein $x$ is greater than about 0.06.

39. A method of detecting thermal radiation comprising:
  subjecting an electrically poled body of ferroelectric $Pb_{1-x}La_x(Zr_yTi_z)_{1-x/4}O_3$, wherein $x$ is greater than about 0.015 and $y + z = 1$, to a change in temperature, and
  sensing the voltage produced across the body as a result of the temperature change.

40. The method of claim 39 wherein the body has a dielectric constant $\epsilon$ of greater than about 1,000.

41. The method of claim 40 wherein $x$ is greater than about 0.04.

42. The method of claim 41 wherein the body is essentially in the rhombohedral phase.

43. The method of claim 42 wherein the ratio of $y$ to $z$ is between about 60 to 40 and about 80 to 20.

44. The method of claim 41 wherein the body is essentially in the tetragonal phase.

45. The method of claim 40 wherein the dielectric constant $\epsilon$ is greater than about 3,000.

46. The method of claim 45 wherein $x$ is greater than about 0.06.

47. The method of claim 46 wherein the body is essentially in the rhombohedral phase.

48. The method of claim 47 wherein the ratio of $y$ to $z$ is between about 60 to 40 and about 70 to 30.

49. The method of claim 46 wherein the body is essentially in the tetragonal phase.

50. The method of claim 45 wherein the dielectric constant $\epsilon$ is greater than about 3,600.

51. The method of claim 50 wherein $x$ is greater than about 0.07.

52. The method of claim 51 wherein the body is essentially in the rhombohedral phase.

53. The method of claim 52 wherein the ratio of $y$ to $z$ is between about 62 to 38 and about 70 to 30.

* * * * *